United States Patent
Gongola (10) Patent No.: US 6,874,978 B2
(45) Date of Patent: Apr. 5, 2005

(54) BORING BIT AND METHODS FOR MANUFACTURING BORING BITS

(75) Inventor: Andrew G. Gongola, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 171 days.

(21) Appl. No.: 10/105,823

(22) Filed: Mar. 25, 2002

(65) Prior Publication Data

US 2003/0180108 A1 Sep. 25, 2003

(51) Int. Cl.⁷ .............................................. B23B 51/02
(52) U.S. Cl. .................. 408/144; 76/108.6; 408/199; 408/214; 408/227
(58) Field of Search .............................. 408/144, 199, 408/201, 213, 214, 223, 225, 227, 230; 76/108.1, 108.6, 115

(56) References Cited

U.S. PATENT DOCUMENTS

| | | | |
|---|---|---|---|
| 808,245 A | * 12/1905 | Lund | 408/201 |
| 1,515,548 A | * 11/1924 | Cerotsky | 408/229 |
| 3,165,131 A | * 1/1965 | Mackey | 408/201 |
| 3,267,975 A | * 8/1966 | Enders | 408/200 |
| 3,554,192 A | 1/1971 | Isberner | |
| 3,945,753 A | 3/1976 | Byers et al. | |
| RE28,900 E | 7/1976 | Byers et al. | |
| 4,050,840 A | 9/1977 | Skingle | |
| 4,050,841 A | * 9/1977 | Hildebrandt | 408/213 |
| 4,090,807 A | 5/1978 | Stewart | |
| 4,095,491 A | 6/1978 | Hildebrandt | |
| 5,092,719 A | 3/1992 | Zsiger | |
| 5,098,234 A | 3/1992 | Judkins et al. | |
| 5,302,060 A | 4/1994 | Nystrom et al. | |
| 5,376,092 A | * 12/1994 | Hein et al. | 606/81 |
| 5,607,263 A | 3/1997 | Nespeta et al. | |
| 5,695,304 A | 12/1997 | Ebert | |
| 5,733,076 A | 3/1998 | Basteck | |
| 5,810,517 A | 9/1998 | Bostic | |
| 5,865,571 A | * 2/1999 | Tankala et al. | 408/1 R |
| 5,895,179 A | 4/1999 | Gschwend et al. | |
| 5,971,674 A | 10/1999 | Holley | |
| 5,975,814 A | * 11/1999 | Pomp | 408/225 |
| 6,073,710 A | 6/2000 | Popp et al. | |
| 6,089,337 A | 7/2000 | Kleine et al. | |
| 6,158,304 A | 12/2000 | Packer et al. | |
| 6,213,232 B1 | * 4/2001 | Peetz | 175/394 |
| 6,499,919 B2 | * 12/2002 | Feld | 408/213 |
| 2002/0182021 A1 | * 12/2002 | Hsieh | 408/144 |

FOREIGN PATENT DOCUMENTS

| | | |
|---|---|---|
| GB | 2 225 262 A | 5/1990 |
| JP | 8238617 | 9/1996 |

* cited by examiner

*Primary Examiner*—Daniel W. Howell
(74) *Attorney, Agent, or Firm*—Michael Best & Friedrich LLP (57) ABSTRACT

Boring bits and methods for manufacturing boring bits. The method includes the acts of forming a shank including one end connectable to a power tool and an opposite end, molding a cutting head separate from the shank, the cutting head including a base wall and a side wall extending from the base wall, the base wall having an interior base surface and an exterior base surface, and bonding the shank and the cutting head as a unit including bonding the opposite end of the shank to the exterior base surface.

48 Claims, 5 Drawing Sheets

BORING BIT AND METHODS FOR MANUFACTURING BORING BITS

FIELD OF THE INVENTION

The present invention relates to bits and, more particularly, to boring bits and methods for manufacturing boring bits.

BACKGROUND OF THE INVENTION

A boring bit, such as, for example, a wood boring bit, includes a cutting head and a shank. In some boring bits, the cutting head and shank are cast or forged as a single unit. In some bits, the cutting head is stamped from a thin sheet of metal.

SUMMARY OF THE INVENTION

One independent problem with the above-described boring bits is that the boring bits are costly to cast or forge as a unit due to the large amount of space occupied by such a mold for the integrally-formed boring bits.

Another independent problem with the above-described boring bits is that, when they are cast or forged as a unit, the boring bits often have distortions in the shank and cutting head. Straightening operations are required to properly align the shank to the cutting head.

A further independent problem with the above-described boring bits is that the boring bits can only be made from a single material.

Yet another independent problem with the above-described boring bits is that a cutting head of the boring bit cannot be stamped to include a large wall depth or a large wall thickness, which is required in some cutting applications. The stamped cutting head is too fragile for rugged boring applications.

Another independent problem with the above-described boring bits is that a stamped cutting head cannot be formed with integral support structures for supporting other components, such as, for example, a feed screw, which may be connected to the cutting head.

A further independent problem with the above-described boring bits is that a stamped cutting head cannot be formed with a chip lifter rigidly supported by kerf cutters and/or a feed screw support. An unsupported chip lifter is too fragile for rugged boring applications.

Yet another independent problem with the above described boring bits is that a stamped cutting head cannot be formed with a counterweight located adjacent to the chip lifter. The counterweight is necessary to balance boring bits during rotation.

Another independent problem with the above described boring bits is that a stamped cutting head cannot be formed with a support shoulder to which a shank is mounted. The shoulder is necessary to offset the welding or brazing operation used to mount the shank to the cutting head.

A further independent problem with the above described boring bits is that a stamped cutting head cannot be formed with a chip lifter positioned underneath the support shoulder to remove all material near the center of the cutting head.

The present invention provides a boring bit, such as, for example, a wood boring bit, that substantially alleviates one or more of the above-described and other problems with existing boring bits. More particularly, in some constructions and in some aspects of the invention, the invention provides a boring bit which includes a shank and a molded cutting head that are separately formed and then bonded to one another. In some constructions and in some aspects of the invention, the invention provides a boring bit in which the cutting head is molded to have a side wall with a large depth and a large thickness. In some constructions and in some aspects of the invention, the invention provides a boring bit in which the separately-formed cutting head and shank are permanently bonded as a unit, the shank being aligned with the cutting head during the bonding process. In some constructions and in some aspects of the invention, the invention provides a boring bit in which the cutting head and the shank are formed of two different materials. In some constructions and in some aspects of the invention, the invention provides a boring bit in which the cutting head is molded to include support structures for supporting other components which may be connected to the cutting head.

More particularly, the invention provides a method for manufacturing a boring bit including the acts of forming a shank including one end connectable to a power tool and an opposite end, and molding a cutting head separate from the shank. The cutting head includes a base wall and a side wall extending from the base wall. The base wall includes an interior base surface and an exterior base surface. The method also includes the act of bonding the shank and the cutting head as a unit including bonding the opposite end of the shank to the exterior base surface.

The act of forming a shank may include molding the shank. The act of forming a shank may include forming the shank of a first material, and the act of molding a cutting head may include molding the cutting head of a second material, the second material being different than the first material.

Preferably, the act of molding a cutting head includes molding a side wall having a depth and a thickness, the depth being seven times greater than the thickness. The act of molding a cutting head may include molding a radius defined between the base wall and the side wall. The side wall may have a thickness and the radius may be less than four times greater than the thickness. The act of molding a cutting head may include molding a shank support shoulder extending from the exterior base surface, and the opposite end of the shank may be bonded to the shank shoulder support. The act of bonding the shank and the cutting head as a unit may include welding or brazing the shank and the cutting head as a unit.

The act of molding a cutting head may include molding a counterweight extending from the interior base surface. The act of molding a cutting head may include molding a chip lifter. The act of molding a cutting head may include molding at least one kerf cutter, the at least one kerf cutter may protrude outside of the side wall.

The act of bonding the shank and the cutting head as a unit may include welding the shank and the cutting head as a unit. The act of bonding the shank and the cutting head as a unit may include brazing the shank and the cutting head as a unit. The act of molding a cutting head may include molding a side wall that has a first thickness and a second thickness, the first thickness and the second thickness being different.

The act of molding a cutting head may include molding a feed screw support extending from the interior base surface. The method may also include the act of forming internal threads in the feed screw support. The method may further include the acts of providing a feed screw and threading the feed screw into the feed screw support.

Also, the invention provides a method for manufacturing a boring bit including the acts of forming a shank including one end connectable to a power tool and an opposite end, and molding a cutting head separate from the shank, the cutting head including a base wall having an interior base surface and an exterior base surface. The cutting head also includes a side wall extending from the base wall. The side wall has a depth and a thickness, the depth being seven times greater than the thickness. The method also includes the act of bonding the shank and the cutting head as a unit including bonding the opposite end of the shank to the exterior base surface.

In addition, the invention provides a method for manufacturing a boring bit including the acts of forming a shank including one end connectable to a power tool and an opposite end, and molding a cutting head separate from the shank, the cutting head including a base wall having an interior base surface and an exterior base surface. The cutting head also includes a side wall extending from the base wall. The side wall has a thickness, and a radius is defined between the base wall and the side wall. The radius is less than four times greater than the thickness. The method also includes the act of bonding the shank and the cutting head as a unit including bonding the opposite end of the shank to the exterior base surface.

The act of molding a cutting head may include molding an inner radius, and the inner radius may be less than four times greater than the thickness of the side wall. The act of molding a cutting head may include molding an outer radius, and the outer radius may be less than five times greater than the thickness of the side wall. The act of molding a cutting head may include molding a radius, the radius being less than or equal to two times greater than the thickness of the side wall. The act of molding a cutting head may include molding a radius, the radius being less than or equal to the thickness of the side wall.

Further, the invention provides a boring bit provided by a method including the acts of forming a shank including one end connectable to a power tool and an opposite end, and molding a cutting head separate from the shank. The cutting head includes a base wall and a side wall extending from the base wall. The base wall has an interior base surface and an exterior base surface. The method also includes the act of bonding the shank and the cutting head as a unit including bonding the opposite end of the shank to the exterior base surface.

Also, the invention provides a boring bit provided by a method including the acts of forming a shank including one end connectable to a power tool and an opposite end, and molding a cutting head separate from the shank, the cutting head including a base wall having an interior base surface and an exterior base surface. The cutting head also includes a side wall extending from the base wall. The side wall has a depth and a thickness, the depth being seven times greater than the thickness. The method also includes the act of bonding the shank and the cutting head as a unit including bonding the opposite end of the shank to the exterior base surface.

In addition, the invention provides a boring bit provided by a method comprising the acts of forming a shank including one end connectable to a power tool and an opposite end, and molding a cutting head separate from the shank, the cutting head including a base wall having an interior base surface and an exterior base surface. The cutting head also includes a side wall extending from the base wall. The side wall has a thickness, and a radius is defined between the base wall and the side wall. The radius is less than four times greater than the thickness. The method also includes the act of bonding the shank and the cutting head as a unit including bonding the opposite end of the shank to the exterior base surface.

Further, the invention provides a boring bit including a shank including one end connectable to a power tool and an opposite end, and a molded cutting head including a base wall having an interior base surface and an exterior base surface. The cutting head also includes a side wall extending from the base wall. The side wall has a thickness, and a radius is defined between the base wall and the side wall. The radius is less than four times greater than the thickness. The cutting head, after molding, is bonded to the shank as a unit such that the opposite end of the shank is bonded to the exterior base surface.

One independent advantage of the present invention is that, for the molded components of the boring bit, the space occupied by the molds for such components is greatly reduced in comparison to the single mold for an integrally-formed boring bit.

Another independent advantage of the present invention is that, because the shank and cutting head are separately formed and then bonded as a unit, the shank and the cutting head may be aligned during bonding to minimize any distortions or misalignment in the boring bit, eliminating the need for any straightening of the shank.

A further independent advantage of the present invention is that the boring bits may be formed from a single material or from more than one material.

Yet another independent advantage of the present invention is that the cutting head may be formed with a side wall having a large wall depth and a large wall thickness, which may be required in some cutting applications, such as, for example, rugged boring applications.

Another independent advantage of the present invention is that the cutting head may be formed with integral support structures for supporting other components, such as, for example, a feed screw or a separate shank, which may be connected to the cutting head.

A further independent advantage of the present invention is that the cutting head may be formed with a chip lifter rigidly supported by kerf cutters and/or a feed screw support.

Yet another independent advantage of the present invention is that the cutting head may be formed with a counterweight located adjacent to the chip lifter.

Another independent advantage of the present invention is that the cutting head may be formed with a support shoulder to which the shank may be mounted.

A further independent advantage of the present invention is that the cutting head may be formed with a chip lifter positioned underneath the support shoulder to remove material near the center of the cutting head.

Other independent features and independent advantages of the invention will become apparent to those skilled in the art upon review of the detailed description, claims and drawings.

Before one embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 1:
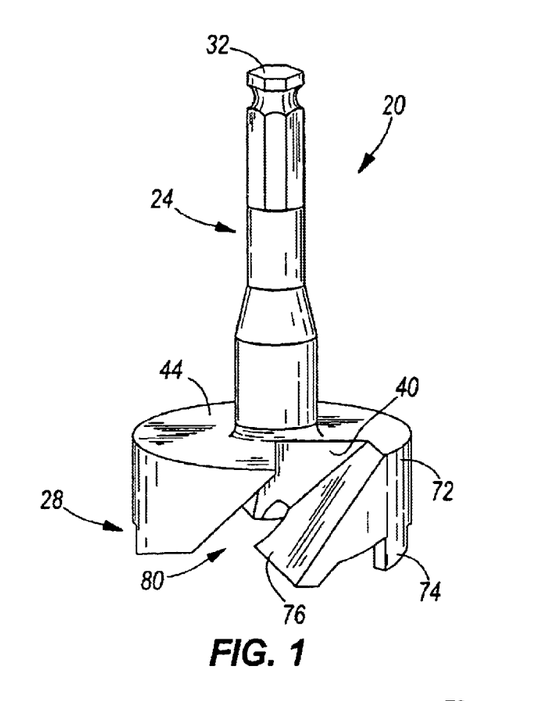
FIG. 1 is a perspective view of a boring bit embodying the present invention.
Figures 2, 7:
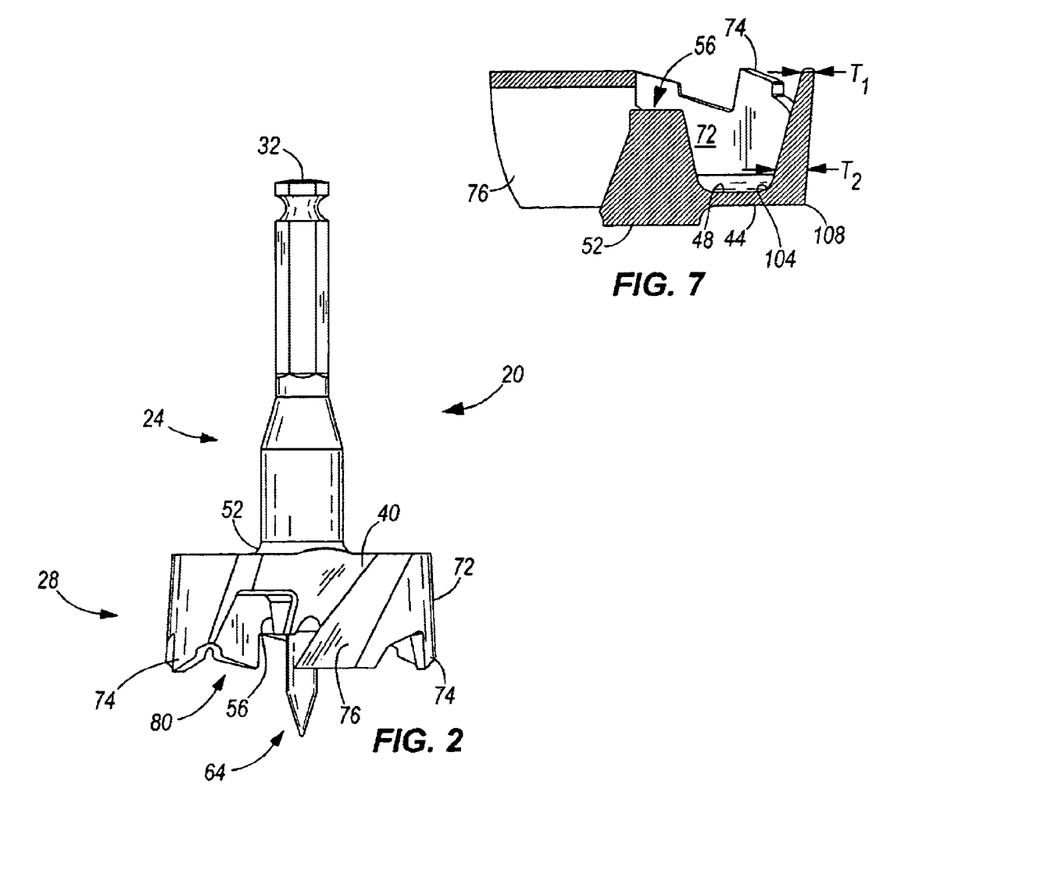
FIG. 2 is a side view of the boring bit embodying the present invention.
FIG. 7 is a cross-sectional view of the cutting head taken generally along line 7—7 in FIG. 6.

FIGS. 1 and 2 illustrate a boring bit 20, such as, for example, a wood boring bit, embodying the present invention. The boring bit 20 includes a shank 24 and a cutting head 28. The shank 24 and the cutting head 28 are separately formed and are preferably permanently bonded as a unit by bonding means, such as, but not limited to welding and brazing.

Figure 3:
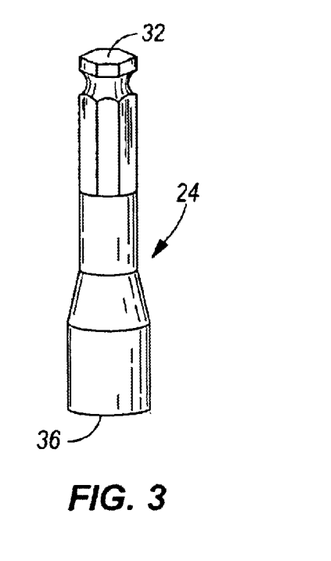
FIG. 3 is a perspective view of a shank of the boring bit shown in FIG. 1.
Figures 4, 5:
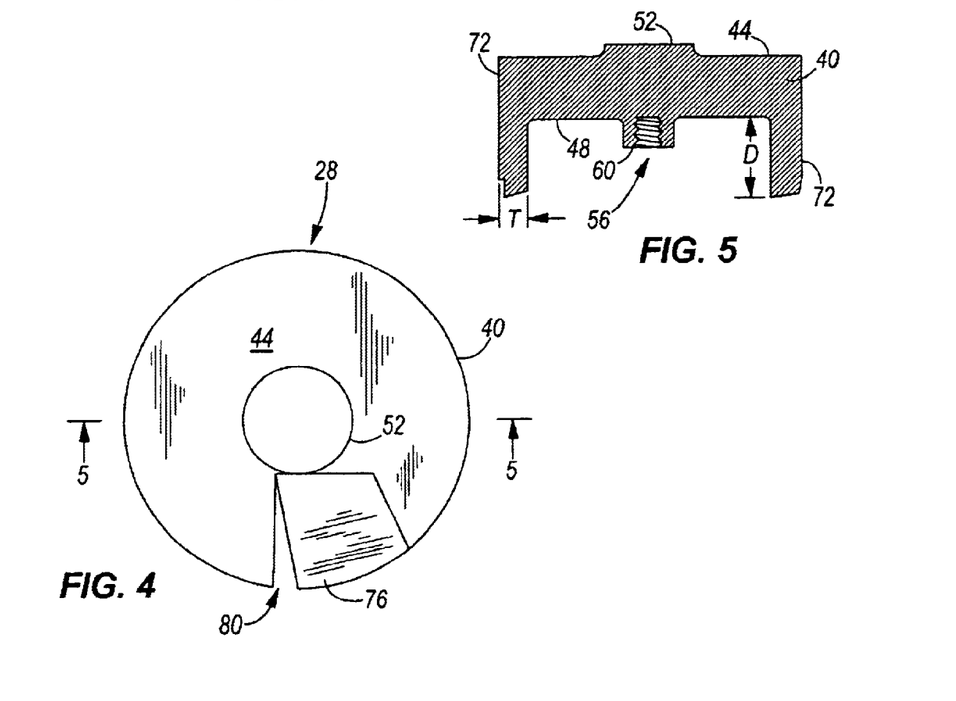
FIG. 4 is a top view of a cutting head of the boring bit shown in FIG. 1.
FIG. 5 is a cross-sectional view of the cutting head taken generally along line 5—5 in FIG. 4.
Figure 6:
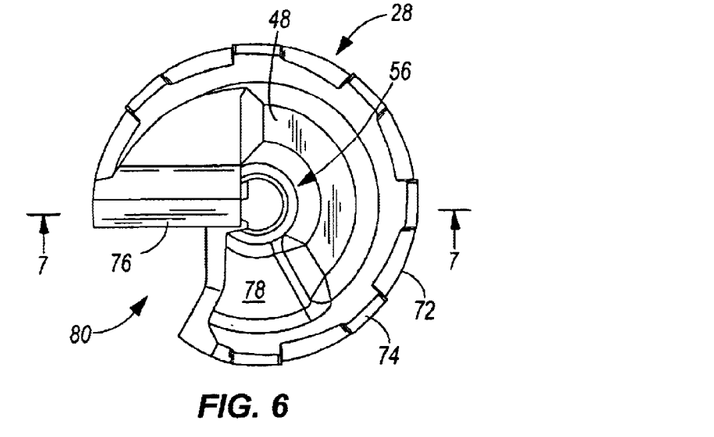
FIG. 6 is a bottom view of the cutting head of the boring bit shown in FIG. 1.
Figure 8:
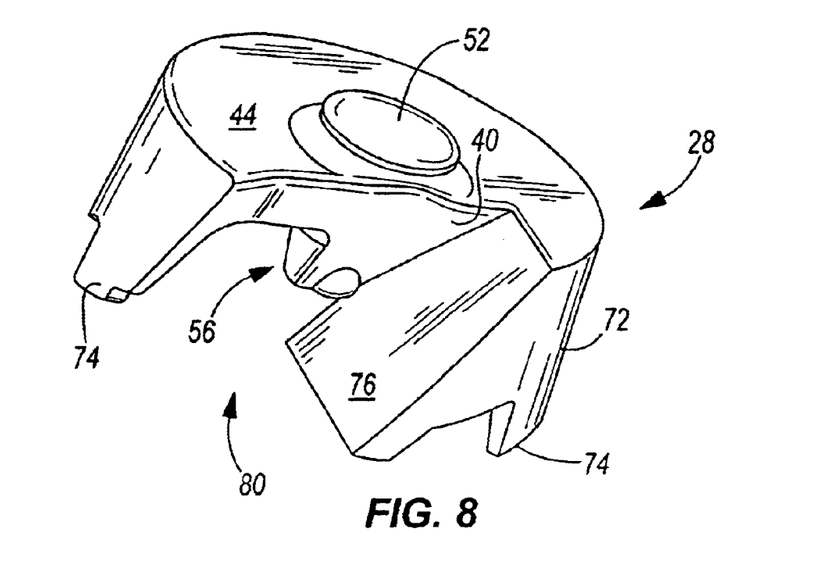
FIG. 8 is a top perspective view of the cutting head of the boring bit shown in FIG. 1.
Figure 9:
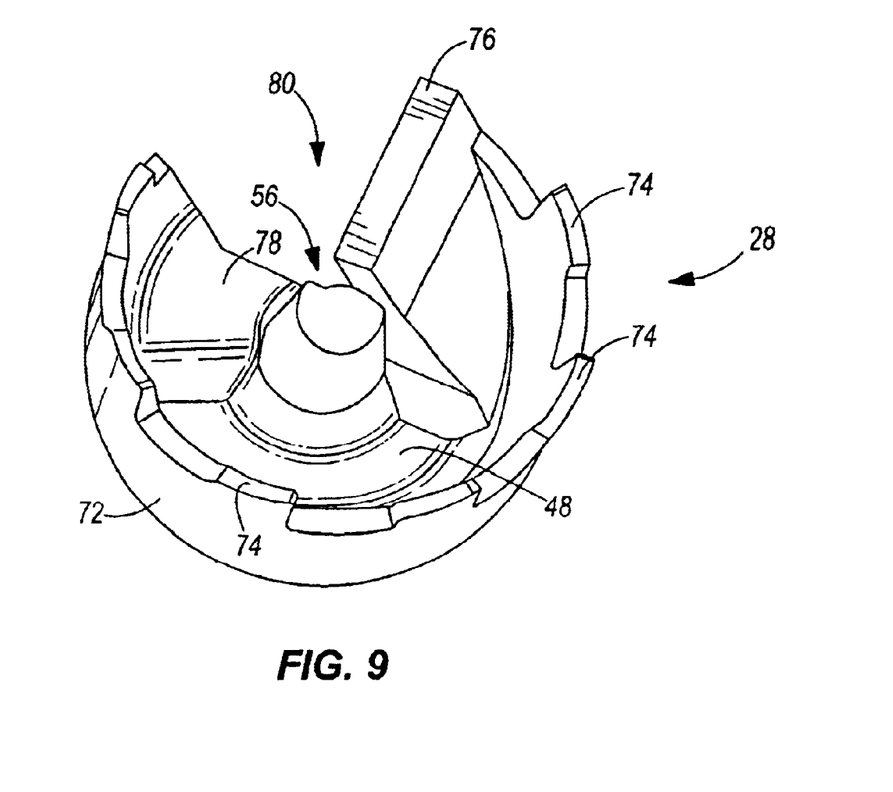
FIG. 9 is a bottom perspective view of the cutting head of the boring bit shown in FIG. 1.

As shown in FIG. 3, the shank 24 includes a first end 32 that is selectively connectable to a power tool (not shown) so that the power tool drives the boring bit 20. The shank 24 also includes an opposite end 36 that, in the illustrated construction, has a slightly larger diameter than the first end 32. The opposite end 36 is bonded to the cutting head 28 (as discussed in greater detail below). The shank 24 may be forged or formed by other processes, such as, for example, molding.

As shown in FIGS. 4–9, the cutting head 28 includes a base wall 40 having an exterior base surface 44 and an interior base surface 48. A support shoulder 52 is preferably molded on and extends from the exterior base surface 44. The opposite end 36 of the shank 24 is bonded to the support shoulder 52. A feed screw support 56 is preferably molded on and extends from the interior base surface 48 and includes internal threads 60.

Figure 10:
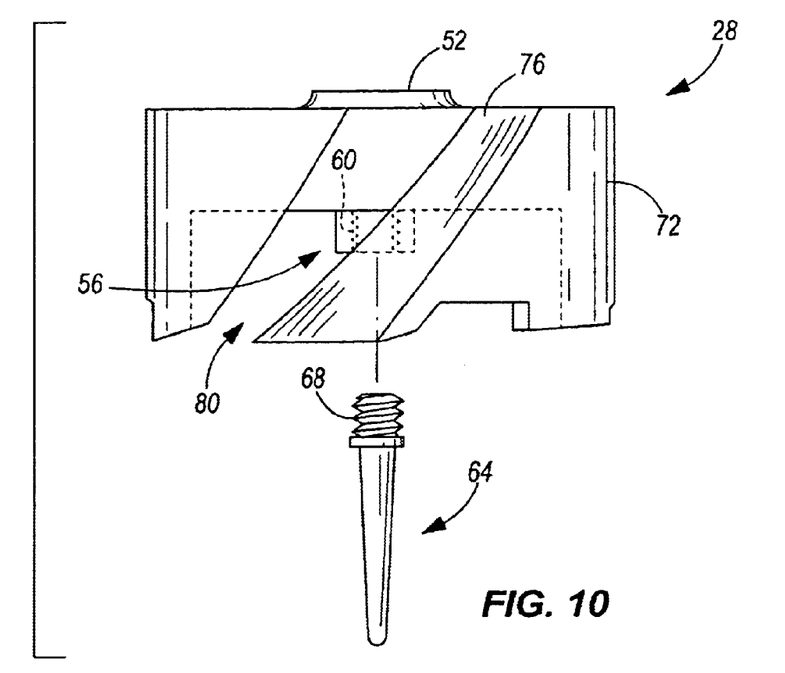
FIG. 10 is an exploded side view of the cutting head shown in FIG. 1.
Figure 11:
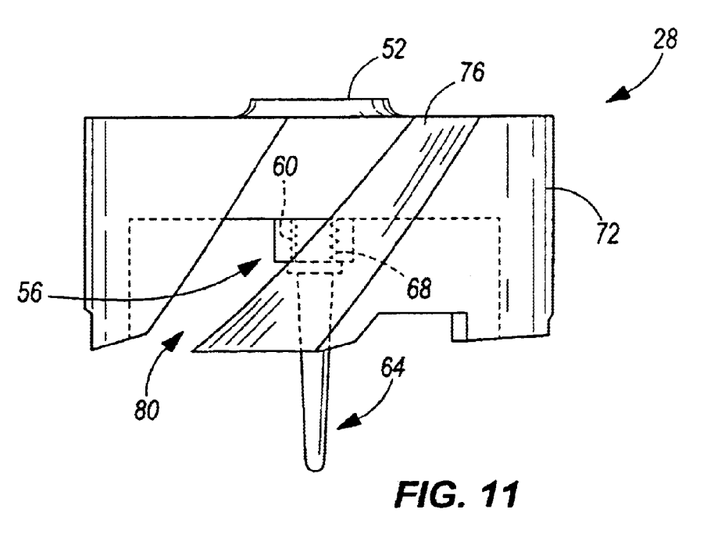
FIG. 11 is a side view of the cutting head shown in FIG. 1.

As shown in FIGS. 2, 10 and 11, the cutting head 28 also includes a feed screw 64 formed separately from the cutting head 28. The feed screw 64 includes external threads 68, which are complementary to the internal threads 60 in the feed screw support 56. The feed screw 64 is selectively threadable into the feed screw support 56. If worn or damaged, the separate feed screw 64 may be removed and replaced with another feed screw (not shown).

Such support structures (i.e., the support shoulder 52 and the feed screw support 56) cannot be formed on a cutting head by means of stamping the cutting head.

Referring back to FIGS. 4–9, the cutting head 28 also includes an annular side wall 72 that extends generally perpendicular from the base wall 40. Kerf cutters 74 are defined in and protrude outside of the side wall 72 (illustrated best in FIG. 6). The kerf cutters 74 cut a hole slightly wider than the side wall 72 to decrease the amount of friction on the side wall 72 during cutting. A chip lifter 76 is defined in the side wall 72 for lifting and removing material, such as, for example, wood, metal, plastic, ceramic, etc. The chip lifter 76 may be formed integrally with cutting head 28 or may be formed separately from and connected to cutting head 28 (i.e., carbide cutting teeth). The chip lifter 76 undercuts the support shoulder 52 to remove material from the center of the boring bit 20. The chip lifter 76 cannot be formed on the cutting head 28 by means of stamping the cutting head 28. The stamping operation cannot produce a chip lifter that is rigidly attached to the kerf cutters 74 and the feed screw support 56, and the stamping operation cannot produce a chip lifter that undercuts the support shoulder 52.

The cutting head 28 also includes a counterweight 78 that extends from the interior base surface 48 to assist in balancing against the weight of the chip lifter 76 during cutting. A gullet or chip removal space 80 is formed adjacent to the chip lifter 76 to assist the chip lifter 76 in removal of debris and/or material which could hinder cutting.

The side wall 72 has a depth D and a thickness T. In the illustrated constructions, the depth D is at least seven times greater than the thickness T. Because the depth D is seven times greater than the thickness T, the cutting head 28 can not be stamped. If stamping were used to form the cutting head 28, the side wall 72 would fracture due to the relatively large depth D and small thickness T (compared to the depth D) of the side wall 72.

Figure 12:
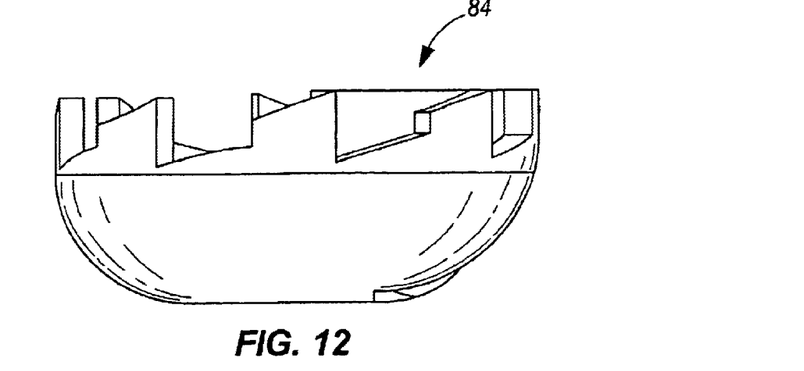
FIG. 12 is a side view of a stamped cutting head.
Figure 13:
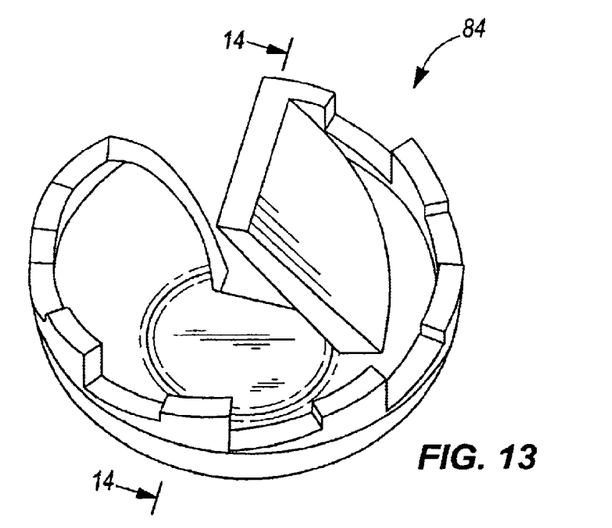
FIG. 13 is a bottom perspective view of the cutting head in FIG. 12.
Figure 14:
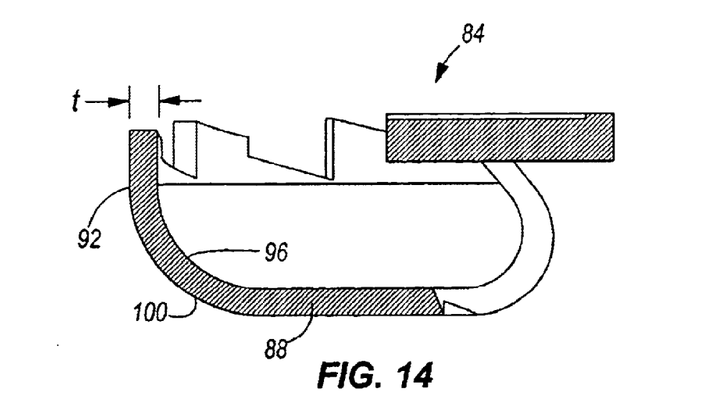
FIG. 14 is a cross-sectional view of the stamped cutting head taken generally along line 14—14 in FIG. 13

A stamped cutting head 84 is illustrated in FIGS. 12–14. The stamped cutting head 84 includes a base wall 88 and a side wall 92 that extends from the base wall 88 and has a thickness t. An inner radius 96 and an outer radius 100 are defined between the base wall 88 and the side wall 92. The thickness t of the material forming the stamped cutting head 84 is substantially uniform.

To stamp the cutting head 84, the inner radius 96 must be at least four times greater than the thickness t. This in turn, requires the outer radius 100 to be at least five times greater than the thickness t. If radii of lesser magnitudes (relative to the thickness t) were used, the cutting head 84 would be pierced by a stamping punch (not shown) rather than being stamped or bent into the desired cup-shape. Because the inner and outer radii 96 and 100 have to be four and five times greater than the thickness t of the side wall 92, respectively, the cutting head 84 can not be stamped to provide a cutting head having a small diameter and a minimum required thickness t.

As shown in FIG. 7, the cutting head 24 of the present invention includes an inner radius 104 and an outer radius 108 defined between the base wall 40 and the side wall 72. By molding the cutting head 24, the inner and outer radii 104 and 108 are independent from the thickness T of the side wall 72, therefore, increasing the manufacturing capabilities of the cutting head 24. Particularly, the cutting head 24 can be molded to have relatively small diameters and relatively large side wall thickness T, unlike the above-described stamped cutting head 84.

The molded boring bit 20 provides greater flexibility than stamped boring bits in manufacturing and design processes. Particularly, the thickness of the components of the boring bit 20 are independent of each other, unlike the stamped cutting head 84 in which the inner and outer radii 96 and 100 are dependent upon the thickness t of the side wall 92. More particularly, the inner and outer radii 104 and 108 of the cutting head 28 are independent of the thickness T of the side wall 72. The side wall 72 may also have a non-uniform wall thickness as illustrated in FIG. 7. In the illustrated construction, the side wall 72 has a first or upper thickness $T_1$ and a second or lower thickness $T_2$ which are different from each other. Also, the thickness of the side wall 72 may be different than the thickness of the base wall 40.

To manufacture the boring bit 20, the shank 24 and the cutting head 28 are formed separately. The cutting head 24 is molded to have the side wall 72 having the depth D and thickness T and to include, in the illustrated construction and in some aspects of the invention, the support shoulder 52 and the feed screw support 56.

The shank 24 and the cutting head 28 are bonded as a unit. The opposite end 36 of the shank 24 is bonded to the support shoulder 52. The shank 24 and cutting head 28 are preferably permanently bonded by, for example, welding or brazing.

The internal threads 60 are formed in the feed screw support 56. The feed screw 64 is threadedly connected to the feed screw support 56. The feed screw 64 may be removably connected to the cutting head 28 for easy replacement.

Although particular constructions of the present invention have been shown and described, other alternative constructions will be apparent to those skilled in the art and are within the intended scope of the present invention. Thus, the present invention is to be limited only by the following claims.

I claim:

1. A method for manufacturing a boring bit, the method comprising the acts of:
   forming a shank including one end connectable to a power tool and an opposite end;
   molding a cutting head separate from the shank, the cutting head including a base wall and a side wall extending from the base wall, the base wall having an interior base surface and an exterior base surface; and
   bonding the shank and the cutting head as a unit including bonding the opposite end of the shank to the exterior base surface;
   wherein the act of molding a cutting head includes molding a counterweight extending from the interior base surface.

2. The method as claimed in claim 1, wherein the act of forming a shank includes forging the shank.

3. The method as claimed in claim 1, wherein the act of forming a shank includes forming the shank of a first material and wherein the act of molding a cutting head includes molding the cutting head of a second material, the second material being different than the first material.

4. A method for manufacturing a boring bit, the method comprising the acts of:
   forming a shank including one end connectable to a power tool and an opposite end;
   molding a cutting head separate from the shank, the cutting head including a base wall and a side wall extending from the base wall, the base wall having an interior base surface and an exterior base surface; and
   bonding the shank and the cutting head as a unit including bonding the opposite end of the shank to the exterior base surface;
   wherein the act of molding a cutting head includes molding a side wall having a depth and a thickness, the depth being seven times greater than the thickness.

5. The method as claimed in claim 1, wherein the act of molding a cutting head includes molding a cutting head including a portion between the base wall and the side wall, the portion between the base wall and side wall having a radius and the side wall having a thickness, the radius being less than four times the thickness of the side wall.

6. The method as claimed in claim 1, wherein the act of molding a cutting head includes molding a shank support shoulder extending from the exterior base surface, and wherein the bonding act includes bonding the opposite end of the shank to the shank shoulder support.

7. A boring bit provided by a method comprising the acts of:
   forming a shank including one end connectable to a power tool and an opposite end;
   molding a cutting head separate from the shank, the cutting head including a base wall having an interior base surface and an exterior base surface, the cutting head also including a side wall extending from the base wall, the side wall having a depth and a thickness, the depth being seven times greater than the thickness; and
   bonding the shank and the cutting head as a unit including bonding the opposite end of the shank to the exterior base surface.

8. The method as claimed in claim 1, wherein the act of molding a cutting head includes molding a chip lifter.

9. The method as claimed in claim 1, wherein the act of molding a cutting head includes molding at least one kerf cutter, the at least one kerf cutter protruding outside of the side wall.

10. The method as claimed in claim 1, wherein the act of molding a cutting head includes molding a feed screw support extending from the interior base surface.

11. The method as claimed in claim 10, further comprising the act of forming internal threads in the feed screw support.

12. The method as claimed in claim 11, further comprising the acts of:
    providing a feed screw; and
    threading the feed screw into the feed screw support.

13. The method as claimed in claim 1, wherein the act of bonding the shank and the cutting head as a unit includes welding the shank and the cutting head as a unit.

14. The method as claimed in claim 1, wherein the act of bonding the shank and the cutting head as a unit includes brazing the shank and the cutting head as a unit.

15. The method as claimed in claim 1, wherein the act of molding a cutting head includes molding a side wall having a first thickness and a second thickness, the first thickness and the second thickness being different.

16. A method for manufacturing a boring bit, the method comprising the acts of:
    forming a shank including one end connectable to a power tool and an opposite end;
    molding a cutting head separate from the shank, the cutting head including a base wall having an interior base surface and an exterior base surface, the cutting head also including a side wall extending from the base wall, the side wall having a depth and a thickness, the depth being seven times greater than the thickness; and
    bonding the shank and the cutting head as a unit including bonding the opposite end of the shank to the exterior base surface.

17. The method as claimed in claim 16, wherein the act of molding a cutting head includes molding a cutting head including a portion between the base wall and the side wall, the portion between the base wall and the side wall having a radius less than four times the thickness of the side wall.

18. The method as claimed in claim 16, wherein the act of forming a shank includes forging the shank.

19. The method as claimed in claim 16, wherein the act of forming a shank includes forming the shank of a first material, and wherein the act of molding a cutting head includes molding the cutting head of a second material, the second material being different than the first material.

20. The method as claimed in claim 16, wherein the act of molding a cutting head includes molding a shank support shoulder extending from the exterior base surface, and wherein the bonding act includes bonding the opposite end of the shank to the shank shoulder support.

21. The method as claimed in claim 16, wherein the act of molding a cutting head includes molding a feed screw support extending from the interior base surface.

22. The method as claimed in claim 21, further comprising the act of forming internal threads in the feed screw support.

23. The method as claimed in claim 22, further comprising the acts of:
providing a feed screw; and
threading the feed screw into the feed screw support.

24. The method as claimed in claim 16, wherein the act of bonding the shank and the cutting head as a unit includes welding the shank and the cutting head as a unit.

25. The method as claimed in claim 16, wherein the act of bonding the shank and the cutting head as a unit includes brazing the shank and the cutting head as a unit.

26. The method as claimed in claim 16, wherein the act of molding a cutting head includes molding a side wall having a first thickness and a second thickness, the first thickness and the second thickness being different.

27. A method for manufacturing a boring bit, the method comprising the acts of:
forming a shank including one end connectable to a power tool and an opposite end;
molding a cutting head separate from the shank, the cutting head including a base wall having an interior base surface and an exterior base surface, the cutting head also including a side wall extending from the base wall, the side wall having a thickness, the cutting head including a portion between the base wall and the side wall, the portion between the base wall and the side wall having a radius less than four times the thickness of the side wall; and
bonding the shank and the cutting head as a unit including bonding the opposite end of the shank to the exterior base surface;
wherein the act of molding a cutting head includes molding a cutting head including a portion between the base wall and the side wall, the portion between the base wall and the side wall having an inner radius less than four times the thickness of the side wall.

28. The method as claimed in claim 27, wherein the act of forming a shank includes forging the shank.

29. The method as claimed in claim 27, wherein the act of forming a shank includes forming the shank of a first material, and wherein the act of molding a cutting head includes molding the cutting head of a second material, the second material being different than the first material.

30. The method as claimed in claim 27, wherein the act of molding a cutting head includes molding a shank support shoulder extending from the exterior base surface, and wherein the bonding act includes bonding the opposite end of the shank to the shank shoulder support.

31. The method as claimed in claim 27, wherein the act of molding a cutting head includes molding a feed screw support extending from the interior base surface.

32. The method as claimed in claim 31, further comprising the act of forming internal threads in the feed screw support.

33. The method as claimed in claim 32, further comprising the acts of:
providing a feed screw; and
threading the feed screw into the feed screw support.

34. The method as claimed in claim 27, wherein the act of bonding the shank and the cutting head as a unit includes welding the shank and the cutting head as a unit.

35. The method as claimed in claim 27, wherein the act of bonding the shank and the cutting head as a unit includes brazing the shank and the cutting head as a unit.

36. A boring bit provided by a method comprising the acts of:
forming a shank including one end connectable to a power tool and an opposite end;
molding a cutting head separate from the shank, the cutting head including a base wall and a side wall extending from the base wall, the base wall having an interior base surface and an exterior base surface; and
bonding the shank and the cutting head as a unit including bonding the opposite end of the shank to the exterior base surface;
wherein the act of molding a cutting head includes molding a counterweight extending from the interior base surface.

37. A method for manufacturing a boring bit, the method comprising the acts of:
forming a shank including one end connectable to a lower tool and an opposite end;
molding a cutting head separate from the shank, the cutting head including a base wall having an interior base surface and an exterior base surface, the cutting head also including a side wall extending from the base wall, the side wall having a thickness, the cutting head including a portion between the base wall and the side wall, the portion between the base wall and the side wall having a radius less than four times the thickness of the side wall; and
bonding the shank and the cutting head as a unit including bonding the opposite end of the shank to the exterior base surface;
wherein the act of molding a cutting head includes molding a cutting head including a portion between the base wall and the side wall, the portion between the base wall and the side wall having an outer radius less than five times the thickness of the side wall.

38. The method as claimed in claim 27, wherein the radius is less than or equal to two times the thickness of the side wall.

39. The method as claimed in claim 27, wherein the radius is less than or equal to the thickness of the side wall.

40. The method as claimed claim 27, wherein the act of molding a cutting head includes molding a side wall having a first thickness and a second thickness, the first thickness and the second thickness being different.

41. The boring bit provided by the method of claim 36, wherein the act of molding a cutting head includes molding a cutting head including a portion between the base wall and the side wall, the portion between the base wall and the side wall having a radius and the side wall having a thickness, the radius being less than four times the thickness of the side wall.

42. The boring bit provided by the method of claim 36, wherein the act of molding a cutting head includes molding a side wall having a first thickness and a second thickness, the first thickness and the second thickness being different.

43. The boring bit provided by the method of claim 36, wherein the act of molding a cutting head includes molding a shank support shoulder extending from the exterior base surface, and wherein the bonding act includes bonding the opposite end of the shank to the shank shoulder support.

44. The boring bit provided by the method of claim 36, wherein the act of molding a cutting head includes molding a feed screw support extending from the interior base surface.

45. The boring bit provided by the method of claim 36, wherein the act of molding a cutting head includes molding a chip lifter.

46. The boring bit provided by the method of claim 36, wherein the act of molding a cutting head includes molding at least one kerf cutter, the at least one kerf cutter protruding outside of the side wall.

47. The boring bit provided by the method of claim 44, further comprising the act of forming internal threads in the feed screw support.

48. The boring bit provided by the method of claim 47, further comprising the acts of:

provided a feed screw; and threading the feed screw into the feed screw support.

* * * * *